United States Patent [19]
DeBernardi et al.

[11] Patent Number: 5,357,333
[45] Date of Patent: Oct. 18, 1994

[54] APPARATUS FOR MEASURING THE EFFECTIVE REFRACTIVE INDEX IN OPTICAL FIBERS

[75] Inventors: Carlo DeBernardi, Turin; Salvatore Morasca, Como; Fabio Pozzi, Stradella, all of Italy

[73] Assignee: Cselt-Centro Studi E Laboratori Telecomunicazioni SpA, Turin, Italy

[21] Appl. No.: 989,332

[22] Filed: Dec. 11, 1992

[30] Foreign Application Priority Data

Dec. 23, 1991 [IT] Italy ............... T091A001016
Aug. 5, 1992 [IT] Italy ............... T092A000681

[51] Int. Cl.$^5$ ............................................. G01N 21/45
[52] U.S. Cl. ................................. 356/73.1; 356/361
[58] Field of Search .................... 356/73.1, 361

[56] References Cited

U.S. PATENT DOCUMENTS

| | | | |
|---|---|---|---|
| 4,335,961 | 6/1982 | Chou et al. | 356/361 |
| 4,984,884 | 1/1991 | Ryu et al. | 356/73.1 |
| 5,179,420 | 1/1993 | So et al. | 356/73.1 |

FOREIGN PATENT DOCUMENTS 53-140051 12/1978 Japan .................. 356/73.1

OTHER PUBLICATIONS

Patent Abstracts of Japan vol. 8, No. 169 4 Aug. 1984 JP A 59 63 545.
Patent Abstracts of Japan vol. 15, No. 91 5 Mar. 1991 JP A 23 07 042.

*Primary Examiner*—Vincent P. McGraw
*Attorney, Agent, or Firm*—Herbert Dubno

[57] ABSTRACT

Apparatus for measuring the effective refractive index in optical fibers, in which a source sends light radiation, the wavelength of which can be varied within a predetermined interval, into a fiber span, and a detector collects the radiation intensity of the radiation collected by the detector as the wavelength varies, in order to determine the oscillation period of the fiber transmittance or reflectivity and to obtain the effective refractive index from such period.

6 Claims, 3 Drawing Sheets

APPARATUS FOR MEASURING THE EFFECTIVE REFRACTIVE INDEX IN OPTICAL FIBERS

FIELD OF THE INVENTION

The invention relates to a system for characterizing optical fibers and more particularly, to an apparatus for measuring the effective refractive index in said fibers.

BACKGROUND OF THE INVENTION

In the present specification, the expression "effective refractive index", or simply "effective index", without further indications, is used to indicate the group effective index.

Group refractive index $n_g$ is the parameter determining the propagation speed of a light pulse, including a certain range of wavelengths centered about a nominal value $\lambda$, in an optically transparent medium. The group refractive index depends on phase refractive index $n$ according to relation $n_g = n - \lambda dn/d\lambda$. In an optical guide, such as a fiber, the refractive index is replaced by the corresponding effective index. Determination of the group effective index is then necessary whenever knowledge of the propagation speed of a pulse in a guide is desired.

A typical application may be in instruments based on backscattering measurements for locating faults in optical telecommunication fibers or cables in service.

It is known that to perform such measurements a radiation pulse is launched into the fiber under test, the backscattered radiation is analyzed, and the presence of a possible fault and its position are recognized from the delay with which the pulse echo is received, once pulse propagation speed is known. In general, the instruments directly supply distance information, and to this end the operator must each time calibrate the instrument scale, by loading the value of the effective index of the fiber into the instrument. It is evident that the accuracy with which that value is known determines in turn the accuracy of the distance information obtained.

Generally, effective index is determined by fiber manufacturers during fabrication. According to the most widely used technique, a light pulse is launched into a fiber span, the length of which has been previously measured and the end faces of which have been treated so as to increase their reflectivity, and the directly transmitted pulse as well as pulses having undergone one or more reflections at each end face are collected from the end face opposite to the launching end. Speed, and hence effective index, is derived from the propagation time difference. Use of a rather long fiber span (a few meters at least) is required for such measurement.

That technique, even though conceptually simple, has a number of drawbacks. More particularly, it is difficult to measure the span length with the desired accuracy, because a stretch of a meter or more long is not easy to handle: Thus, effective index is generally determined on a single fiber out of a batch, and the value obtained is considered valid for all fibers in the batch, even though a certain degree of tolerance with respect to a nominal value is admitted also for the effective index, like for any other optical fiber characteristic. For that reason, the measurement results is somewhat inaccurate, and that error adds to the systematic errors introduced by the apparatus exploiting the effective index value measured.

OBJECT OF THE INVENTION

It is an object of the invention to provide an apparatus for measuring the effective refractive index which is not based on propagation time measurement, so that it does not require use of a rather long fiber span and hence eliminates the drawbacks mentioned above.

SUMMARY OF THE INVENTION

The apparatus according to the invention comprises:
  means for temporarily connecting a fiber span or stretch under test to the apparatus;
  a source of light radiations whose wavelength can be varied within a predetermined interval;
  means for sending the radiations emitted by the source into the fiber span under test;
  a detector for collecting the radiation outgoing from the fiber span;
  means, connected to the detector output, for measuring the intensity of the radiation collected by the detector as the wavelength varies;
  a computing device, connected to the intensity measuring means, for determining the oscillation period of the fiber transmittance or reflectivity and deriving the effective index value from such a period.

BRIEF DESCRIPTION OF THE DRAWING

The invention will be better understood from the following description, with reference to the annexed drawing in which.

SPECIFIC DESCRIPTION

Figure 1:
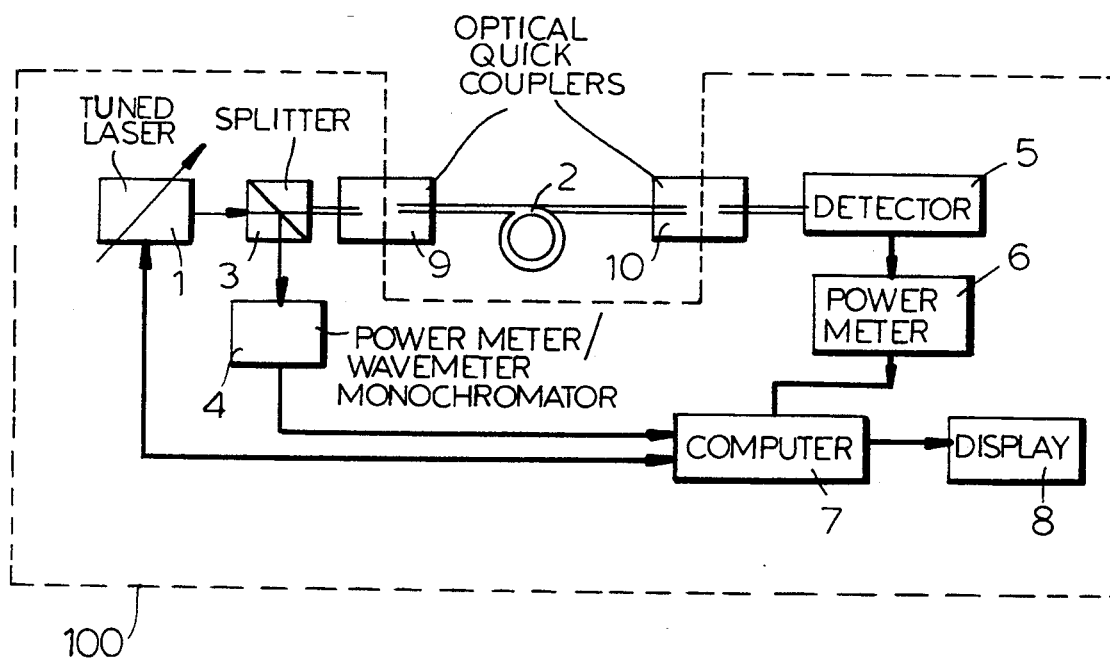
FIG. 1 is a block diagram of a first embodiment of the apparatus, for the case of measurements on transmitted radiations.

In the drawings, thick lines represent electrical connections and thin lines light radiation paths.

In FIG. 1 the apparatus, denoted as a whole by 100, comprises:
  a source 1 (more particularly a wavelength-tunable laser), emitting variable wavelength radiations with high coherence length (i.e. limited linewidth), and sending such radiations into a short optical fiber span 2 under test (e.g. a span some ten centimeters long) through a convenient coupling device 9, of a kind allowing a fast connection of span 2 to apparatus 100 (e.g. a bare fiber connector);
  a detector 5 collecting the radiation transmitted by the fiber, to which it can be connected through a coupling device 10, analogous to device 9;
  a power meter 6, connected to the output of detector 5 and measuring the intensity of the radiation collected by the detector as the wavelength varies;
  a computing device 7, which is connected to source 1 and power meter 6, controls the wavelength variation of source 1, determines the oscillation period of the fiber transmittance, e.g. by a Fourier analysis, and obtains the effective index from the length of span 2 and the oscillation period, by applying mathematical relations which will be expounded hereinafter; and
  a display 8 of the measurement results.

In case source 1 has a non-reproducible power and/or wavelength behavior, a device 4 will be located between source 1 and computing device 7 for measuring the power and/or the wavelength of the radiation emitted by the source. To this aim, device 4 will comprise a power meter and/or a wavemeter (or a monochromator) that receives, e.g. through a beam splitter 3, a fraction of the radiation emitted by source 1. The power meter in device 4 could also coincide with power meter 6.

Figure 2:
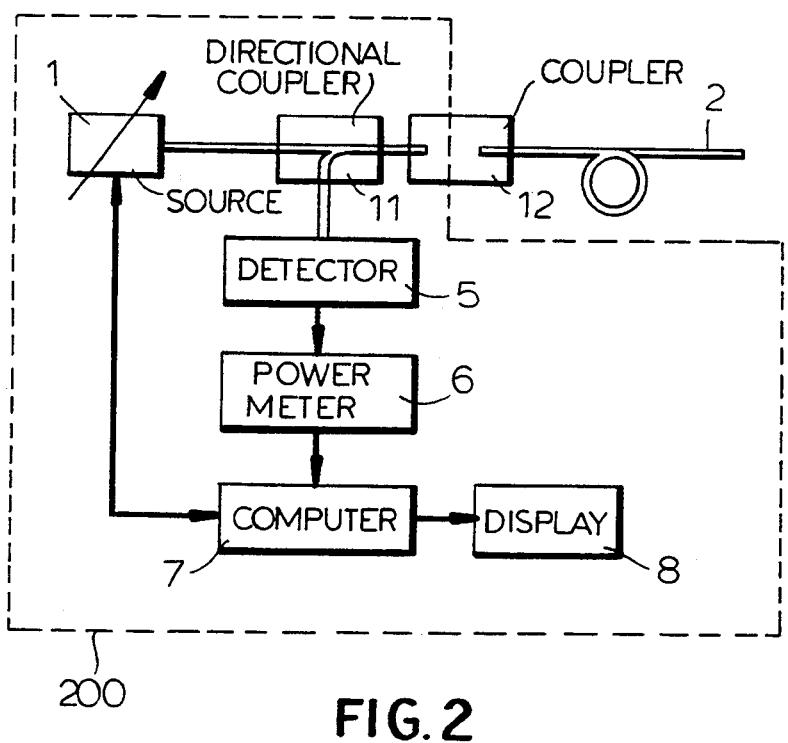
FIG. 2 is a block diagram of a second embodiment of the apparatus, for the case of measurements on reflected radiations.

In the embodiment of FIG. 2, where the elements present also in FIG. 1 are indicated by the same reference numerals, the apparatus, denoted by 200, determines the effective index starting from the oscillation period of fiber reflectivity. In this embodiment, source 1 is a source with reproducible power and wavelength behavior (more particularly a multisection laser) and hence device 4 and the means for supplying it with a fraction of the radiation emitted by source 1 are dispensed with. A directional coupler 11 on the one side sends the radiations emitted by source 1 into fiber 2, through one of the end faces thereof, and on the other side collects the radiations reflected in the fiber and outgoing from the same input face. A bare-fiber coupler 12 (e.g. analogous to couplers 9, 10 in FIG. 1) is associated with the branch of coupler 11 on the fiber side for temporarily connecting the fiber to apparatus 200. The end of fiber span 2 opposite to that connected to coupler 11 can be treated so as to increase its reflectivity or can be associated with means (for instance a mercury-filled cup or capillary) which has the same goal. Alternatively the natural reflectivity of that end could be exploited.

Figure 3:
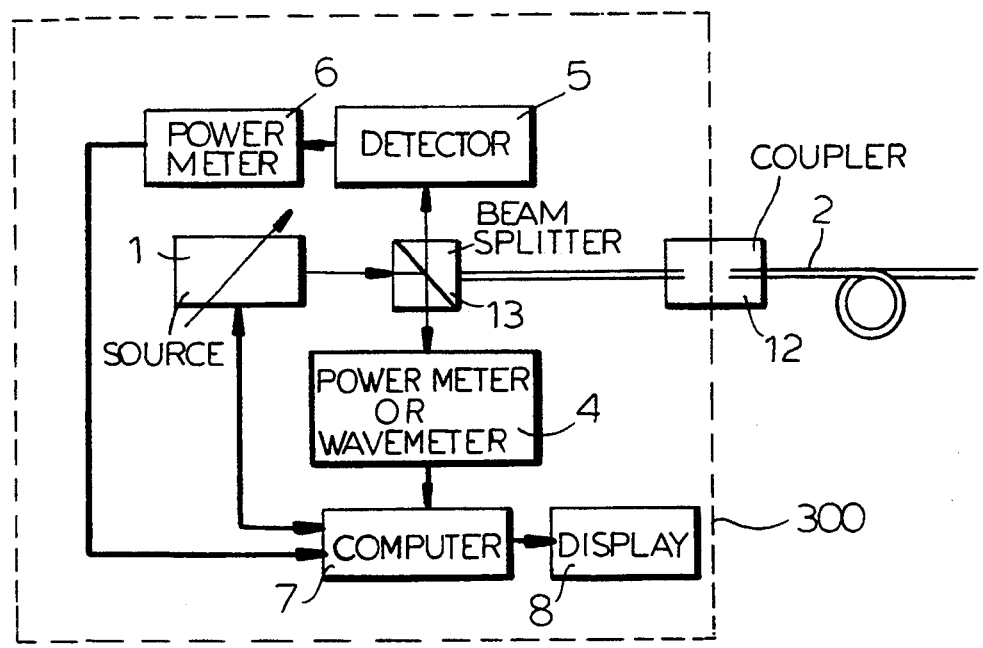
FIGS. 3 to 5 are block diagram of variant embodiments.

In the embodiment of FIG. 3, apparatus 300 comprises again device 4, and a single unit, schematically shown here as a beam splitter 13, is used to supply device 4 with a fraction of the beam emitted by the source and detector 5 with the radiation reflected in the fiber.

Figure 4:
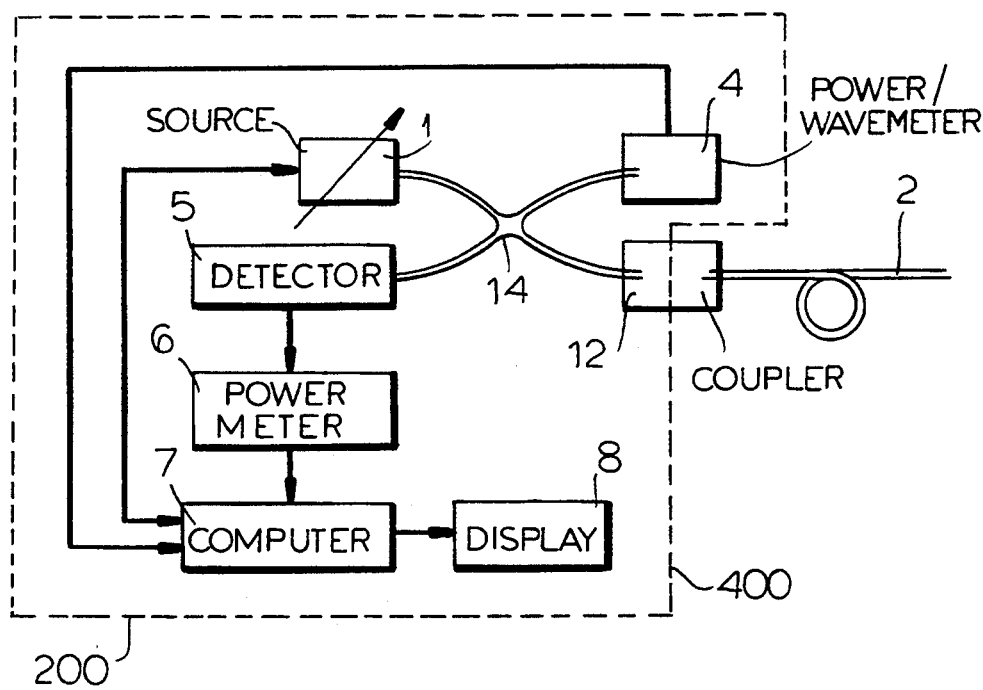

In the embodiment of FIG. 4, apparatus 400 uses a bidirectional X-coupler 14 for the coupling between source 1, device 4, detector 5 and fiber 2. Coupler 14 in one direction sends the radiation outgoing from source 1 into fiber 2 (through coupler 12) and into device 4, and in the opposite direction sends the reflected radiation to detector 5.

The illustrated apparatus exploits a phenomenon noticed in integrated optical guides: when radiations at different wavelengths are sent into a guide, transmittance T of the guide, considered as a Fabry-Perot resonant cavity, is a periodic function of the wavelength and the period depends on the effective index. More particularly, transmittance T of a Fabry-Perot cavity is given by the following relation:

$$T = C \frac{e^{-\alpha L}}{1 + R^2 e^{-2\alpha L} - 2Re^{-\alpha L}\cos\frac{4\pi Ln}{\lambda}} \quad (1)$$

where n is the (phase) refractive index of the medium filling the cavity, $\alpha$ is the cavity internal loss, L is the cavity geometrical length, R the cavity end mirror reflectivity, C a proportionality constant. The period of function (1) is given by $$P = \frac{\bar{\lambda}^2}{2L\left(n - \bar{\lambda}\frac{dn}{d\lambda}\right)} = \frac{\bar{\lambda}^2}{2Ln_g} \quad (2)$$

where $\bar{\lambda}$ is the average wavelength in the considered interval.

Relation (2) applies in case the variation of R and $\alpha$ in the variation interval of $\lambda$ may be neglected in relation (1). For optical fibers, attenuation over a length of some decimeters is so low, in the spectral windows of interest, that not only $d\alpha/d\lambda$, but also $\alpha$ can be neglected in (1). As to the variation of R, if the natural reflectivity of the faces is exploited, it is of about $7$–$10^{-5}$, and therefore also the variation of R can be neglected and relation (2) can be applied without affecting the validity of the results.

Of course, if the cavity reflectivity, given by 1 - T - A, where A represents the effect of the cavity losses, is considered in place of the cavity transmittance T, the variation period is still given by equation (2).

An optical-fiber span, whose end faces always exhibit a certain reflectivity, can also be assimilated to a resonant cavity whose phase refractive index is represented by the phase effective index of the fiber, R is the reflectivity of the fiber end faces, and length L is the span length. By measuring period P as $\bar{\lambda}$ varies, value $n_g$ of the group effective index is immediately derived, once length L and average wavelength in the scanning interval are known.

In use, after the length of span 2 has been measured, the span is connected to apparatus 100 (or 200, 300, 400) through couplers 9, 10 (or 12), and the source wavelength is caused to vary to such an extent as to permit observation of a rather high number of periods of transmittance or reflectivity, so that computing system 7 can accurately determine the period itself and hence the effective index $n_g$. For a satisfactory measurement, at least about one hundred points should be considered in the variation range of $\lambda$. The number of periods desired can be obtained by using either a short span and a wide wavelength variation range or a slightly longer fiber span and a more limited variation interval. Of course the choice will depend also on the available sources. For the above mentioned length, a variation range of a few nanometers will be enough to obtain a sufficient number of periods. If shorter spans are desired, a variation range of some tens of nanometers is required.

To avoid chromatic dispersion problems, use of sources tunable only within a very limited wavelength range (e.g. 0.5–1 nm) may be required. In case the apparatus comprises device 4 (FIGS. 1, 3, 4), the above number of scanning steps requires that wavelengths differing by 0.01 nm or less are distinguished, and such values represent the sensitivity limits of direct measurement instruments like the wavemeter or monochromator referred to above.

Figure 5:
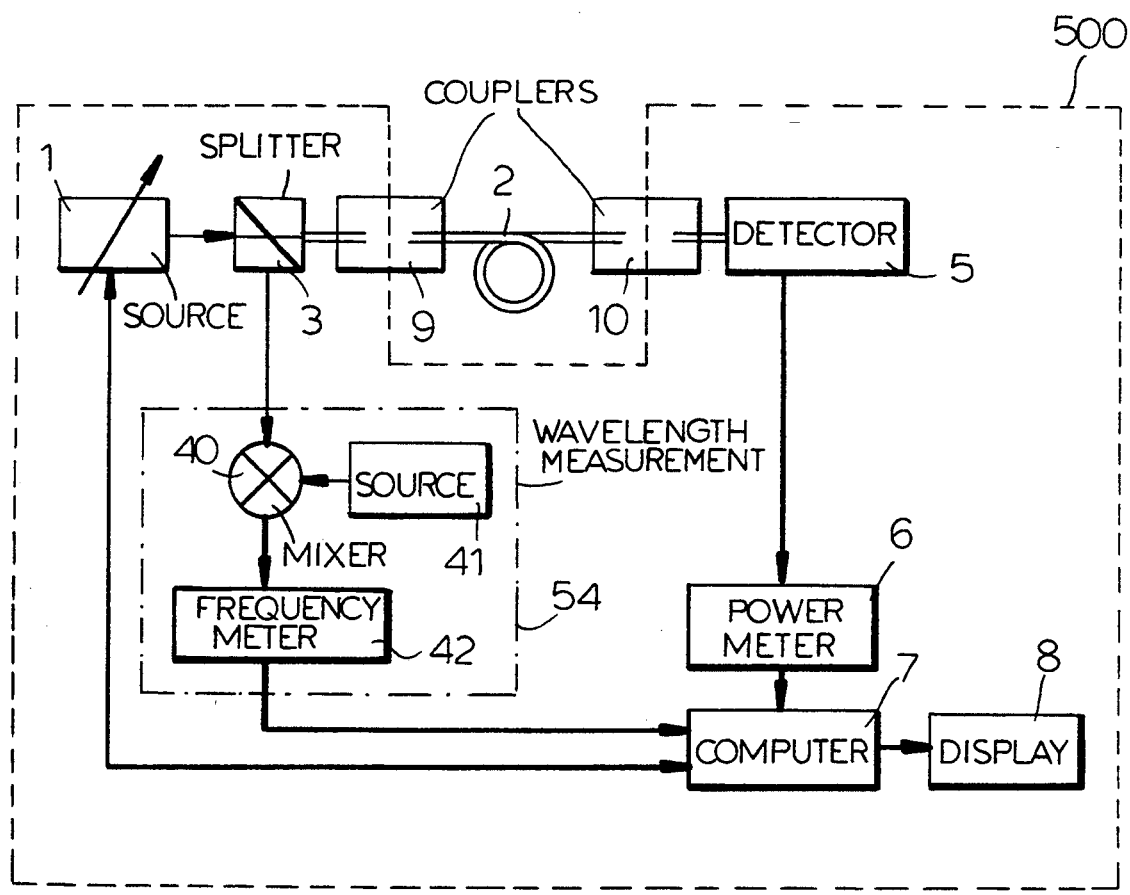

To solve that problem, in the embodiment of FIG. 5, where the apparatus is denoted by 500, a device 54 for measuring the source wavelength (belonging to a device like device 4 in FIGS. 1 and 3) comprises a mixer 40 receiving both the fraction of radiation 1 taken through beam splitter 3, and the radiation emitted by a stabilized source 41, and creates an electrical signal representative of the beat between the two radiations. A frequency measuring device 42, for instance a spectrum analyser, receives the beat signal and supplies computing device 7 with the frequency information. The wavelength of the stabilized source will be for instance such that the beat has a frequency comprised in a range of some tens GHz. Such a frequency range corresponds with the bandwidth of the conventional spectrum analysers. A spectrum analyser can provide a frequency value of such an order of magnitude with a precision of the order of some ten Hz, so that the wavelength of source 1 can be determined with a much greater precision than by a direct measurement.

For sake of simplicity, the means for controlling the source power are not shown. Obviously, device 54 could be used also in apparatus 300 or 400 (FIGS. 3, 4). For sake of simplicity, the means for measuring the source power are not shown.

Since fiber behavior as a resonant cavity is exploited, devices 9, 10, 12 connecting the apparatus and fiber span 2 must allow the span ends to be kept apart from the fiber tails associated with the apparatus elements, so that reflections actually occur at such ends. Besides it is necessary that such devices do not give rise to too considerable cavity effects which might affect the measurement. This can be obtained e.g. by duly shaping the tail ends.

The disadvantages mentioned hereinbefore are actually eliminated by the apparatus: in fact a length of some ten centimeters can be measured with considerable accuracy and without particular handling problems. Effective index measurement is hence a simple and fast operation and can be performed for all fibers in a batch, and not only for a specimen fiber. Besides, determination of the effective index starting from the variation period of transmittance or reflectivity allows results to be obtained which are intrinsically more accurate than those obtainable by propagation time measurements. In the above-described practical application, the fault-locating instrument can then be calibrated with an effective refractive index value determined with high precision just for the particular fiber under test, and not with a value determined for a specimen fiber, and hence a fault can be located with much higher precision, allowing a reduction in repairing time.

It is clear that variations and modifications are possible without going out of the scope of the invention. Thus, in the embodiment of FIGS. 1 and 5, beam splitter 3 can be replaced by a coupler analogous to coupler 11 in FIG. 2; in the embodiments in which fiber reflectivity is analyzed and device 4 is present, two discrete components analogous to components 3 and 11 of FIGS. 1, 2 can be used in place of single devices 13, 14; devices 3, 11, 13, 14 can be fused-fiber couplers, integrated-optics couplers etc.

We claim:

1. An apparatus for measuring an effective refractive index of an optical fiber, said apparatus comprising:
    means for temporarily connecting a stretch of a fiber under test to the apparatus;
    a source of light radiation of a wavelength variable within a predetermined interval;
    means for sending the radiations emitted by the source into the stretch of fiber;
    a detector for collecting radiation outgoing from the stretch of fiber;
    means connected to the output of said detector, for measuring intensity of the radiation collected by the detector as the wavelength of said source varies; and
    a computing unit, connected to the source for controlling the wavelength variation and also connected to the intensity measuring means, to determine the oscillation period of the fiber transmittance of reflectivity and to obtain the effective index value from such a period.

2. The apparatus defined in claim 1, further comprising means, connected to the means for sending the radiation into the fiber, for receiving a fraction of the radiation emitted by the source, to measure at least one parameter selected from the power and the wavelength thereof, and to supply the computing device with data measured.

3. The apparatus defined in claim 2, wherein said means for measuring the parameter comprises a mixer, which receives said fraction of the radiation emitted by the source and the radiation emitted by a stabilized source and generates an electrical signal representative of a beat among such radiations, and a device for measuring the frequency of such a beat as the source wavelength varies.

4. The apparatus defined in claim 1, wherein the computing device determines the effective index from a fiber transmittance oscillation period, and the means for temporarily connecting the stretch of fiber to the apparatus are arranged to connect both ends of the fiber stretch to the apparatus and are associated with the means for sending radiation into the stretch of fiber and with the detector.

5. The apparatus defined in claim 1, wherein the computing device determines the effective index from a fiber reflectivity oscillation period; the means for sending the radiation into the stretch of fiber is arranged to collect and to send to the detector radiations reflected in the stretch of fiber and outgoing from a fiber end into which the radiation has been sent by the source; and the means for temporarily connecting the stretch of fiber to the apparatus is arranged to connect said fiber end to the apparatus.

6. The apparatus defined in claim 4, wherein the temporary connection means are arranged to keep the ends of the fiber stretch spaced apart from fiber tails associated with the radiation sending means and the detector.

* * * * *